(12) United States Patent
Basak et al.

(10) Patent No.: US 11,567,878 B2
(45) Date of Patent: Jan. 31, 2023

(54) SECURITY AWARE PREFETCH MECHANISM

(71) Applicant: Intel Corporation, Santa Clara, CA (US)

(72) Inventors: Abhishek Basak, Bothell, WA (US); Erdem Aktas, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 17/132,010

(22) Filed: Dec. 23, 2020

(65) Prior Publication Data

US 2021/0110031 A1 Apr. 15, 2021

(51) Int. Cl.
| | |
|---|---|
| *G06F 12/14* | (2006.01) |
| *G06F 21/54* | (2013.01) |
| *G06F 21/55* | (2013.01) |
| *G06F 21/79* | (2013.01) |

(52) U.S. Cl.
CPC .............. *G06F 12/14* (2013.01); *G06F 21/54* (2013.01); *G06F 21/554* (2013.01); *G06F 21/79* (2013.01)

(58) Field of Classification Search
CPC ........ G06F 12/14; G06F 21/54; G06F 21/554; G06F 21/79; G06F 21/14
See application file for complete search history.

(56) References Cited

U.S. PATENT DOCUMENTS

| | | | | |
|---|---|---|---|---|
| 4,157,587 A | * | 6/1979 | Joyce | G06F 12/0862 |
| | | | | 711/E12.072 |
| 5,930,832 A | * | 7/1999 | Heaslip | G06F 12/1054 |
| | | | | 712/216 |
| 10,311,229 B1 | * | 6/2019 | Pohlack | G06F 8/41 |
| 10,706,147 B1 | * | 7/2020 | Pohlack | H04L 63/1416 |
| 10,868,665 B1 | * | 12/2020 | Pohlack | H04L 63/1441 |
| 11,144,468 B2 | * | 10/2021 | Basak | G06F 12/0891 |
| 2012/0159103 A1 | * | 6/2012 | Peinado | G06F 12/145 |
| | | | | 711/163 |
| 2017/0286302 A1 | * | 10/2017 | Roy | G06F 12/0831 |
| 2019/0042453 A1 | * | 2/2019 | Basak | G06F 12/128 |
| 2019/0042479 A1 | * | 2/2019 | Basak | G06F 21/78 |
| 2019/0121966 A1 | * | 4/2019 | Park | G06F 21/566 |
| 2019/0130101 A1 | * | 5/2019 | Chen | G06N 3/0454 |
| 2019/0138720 A1 | * | 5/2019 | Grewal | G06F 9/3842 |

(Continued)

FOREIGN PATENT DOCUMENTS

| | | |
|---|---|---|
| CN | 114741333 A | 7/2022 |
| DE | 102021134055 A1 | 6/2022 |
| MY | 136195 A * 8/2008 | ......... G06F 12/1441 |

OTHER PUBLICATIONS

Google Scholar Results Attached (Year: 2022).*

*Primary Examiner* — Ponnoreay Pich

(74) *Attorney, Agent, or Firm* — Jaffery Watson Mendonsa & Hamilton LLP

(57) ABSTRACT

An apparatus to facilitate data cache security is disclosed. The apparatus includes a cache memory to store data; and prefetch hardware to pre-fetch data to be stored in the cache memory, including a cache set monitor hardware to determine critical cache addresses to monitor to determine processes that retrieve data from the cache memory; and pattern monitor hardware to monitor cache access patterns to the critical cache addresses to detect potential side-channel cache attacks on the cache memory by an attacker process.

22 Claims, 6 Drawing Sheets

(56) References Cited

U.S. PATENT DOCUMENTS

| | | | |
|---|---|---|---|
| 2019/0228155 A1* | 7/2019 | Basak | G06F 21/554 |
| 2020/0004684 A1* | 1/2020 | Heirman | G06F 12/0862 |
| 2020/0110710 A1* | 4/2020 | Truelove | G06F 12/1036 |
| 2021/0110031 A1* | 4/2021 | Basak | G06F 12/1466 |
| 2021/0192045 A1* | 6/2021 | Jiang | G06F 21/554 |

* cited by examiner

US 11,567,878 B2

SECURITY AWARE PREFETCH MECHANISM

BACKGROUND OF THE DESCRIPTION

Central processing units (CPUs) include data cache subsystems that store prefetched data from storage in slower memory to a faster local memory before the data is actually needed. However, such cache subsystems are the most common source for architectural side channel attacks (e.g., speculative or traditional) due to the ease of software control over cache state manipulation (e.g., via load, stores, clflush, etc.), comparatively large sizes (e.g., encoding space for secrets), as well as distinct measurable times between a cache subsystem hit and miss.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, pre-fetch security aware pre-fetch hardware is provided to monitor cache accesses to detect side-channel cache attacks. In further embodiments, an interrupt is generated upon detection of a possible detect side-channel cache attack to flag system software of the possible attack onset and a potential need to perform platform level mitigation.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
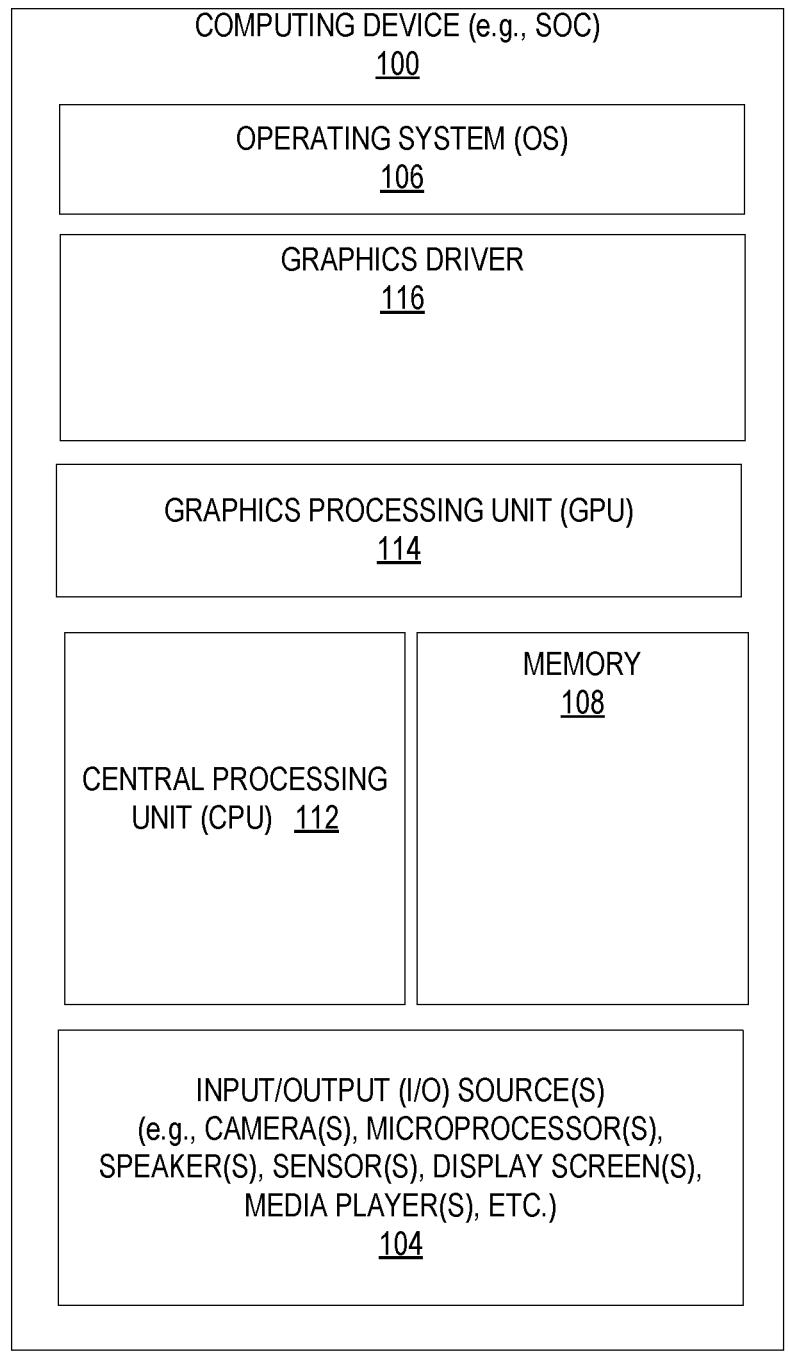
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
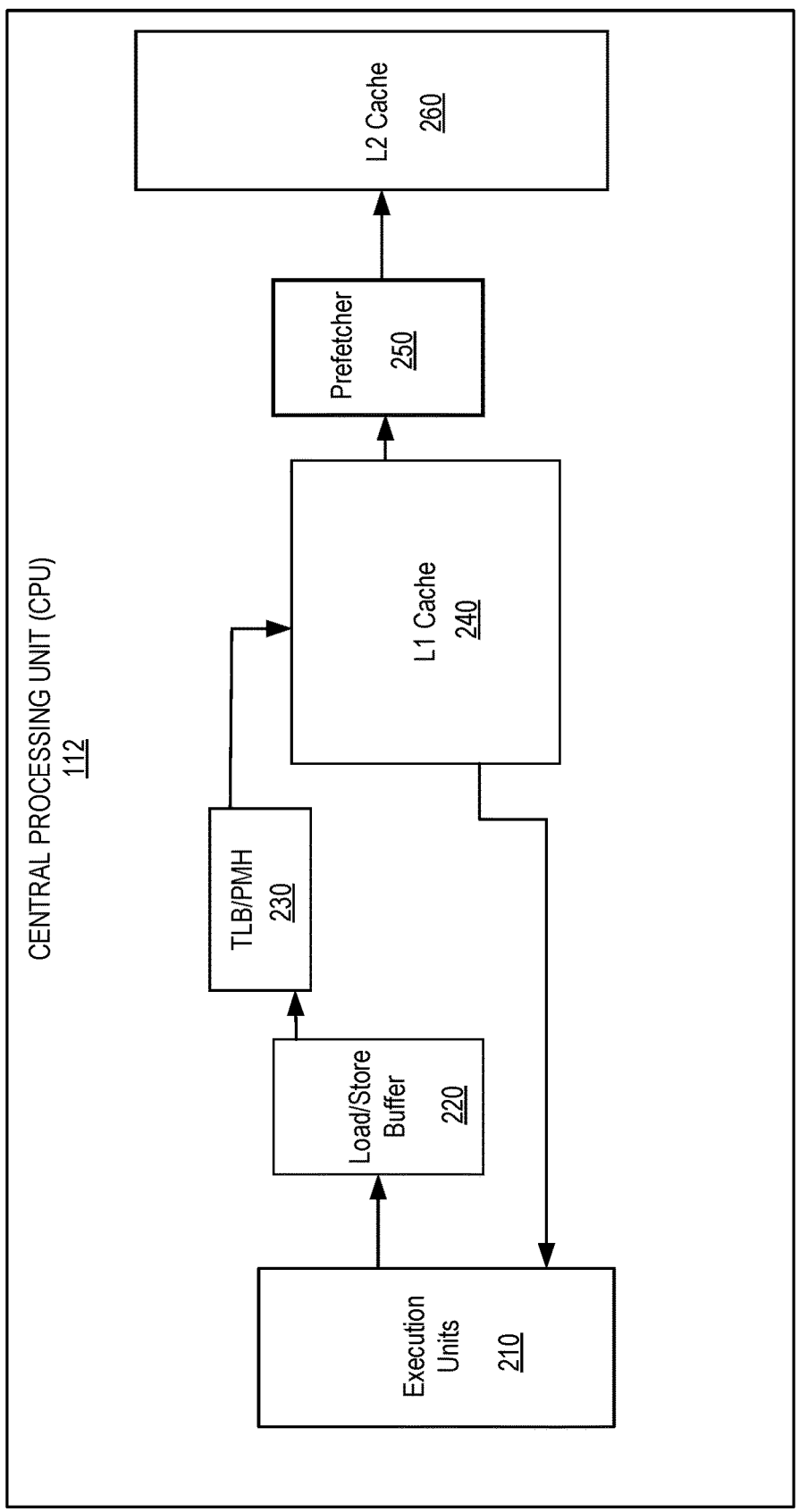
FIG. 2 illustrates one embodiment of a central processing unit.

FIG. 2 illustrates one embodiment of a CPU 112, including execution units 210, load/store buffer 220, translation lookaside buffer (TLB)/page miss handler (PMH) 230, cache (e.g., L1) 240, pre-fetcher 250 and cache (e.g., L2 or higher) 260. As shown in FIG. 2, pre-fetcher 250 sits between L1 cache 240 and L2 cache 260, and receives all information for L1 cache 240 access patterns. In other embodiments, pre-fetcher 250 may be implemented at other levels. For example, pre-fetcher 250 may be a L2 pre-fetcher used to pre-fetch data for L2 cache 260. As discussed above, data cache subsystems are the most common source for architectural side channel attacks, in which an attacker process may monitor cache accesses made by an authorized process (or victim). For example, FIG. 3 is a flow diagram illustrating an exemplary side channel cache attack process.

Figure 3:
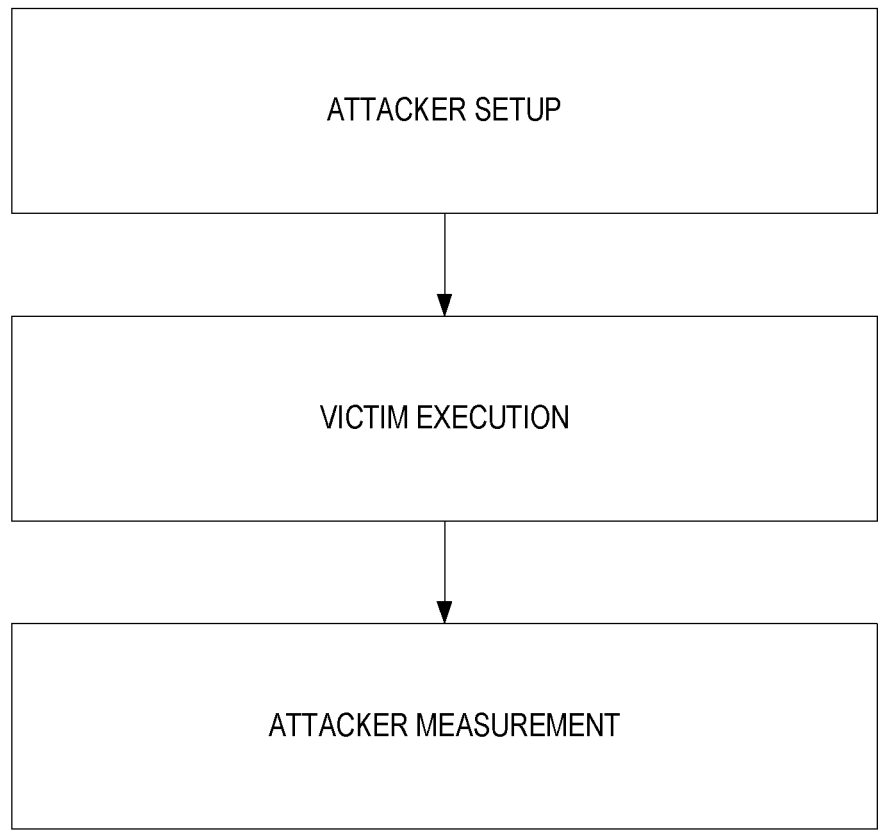
FIG. 3 is a flow diagram illustrating one embodiment of a process performed in a side channel attack.

As shown in FIG. 3, a side channel attack may include an attacker setup, followed by victim execution and an attacker measurement. An attacker setup phase involves flushing or evicting elements of a shared array (e.g., flush+reload), or loading a private array (Prime+Probe) in an iterative loop. The victim execution phase comprises specification of an address range (e.g., pages) for protection and resuming normal execution, while performing attacker measurements includes loading elements of the array (e.g., used for setup) in an attempt to find a hit/miss.

According to one embodiment, a security aware pre-fetcher is disclosed that detects cache side channel aware patterns in real time. In a further embodiment, pre-fetcher 250 initiates a flag (e.g., via an interrupt scheme) in response to a detection of a possible side channel cache attack to inform system software that a possible attack is occurring and that platform level mitigation may need to be performed.

Figure 4:
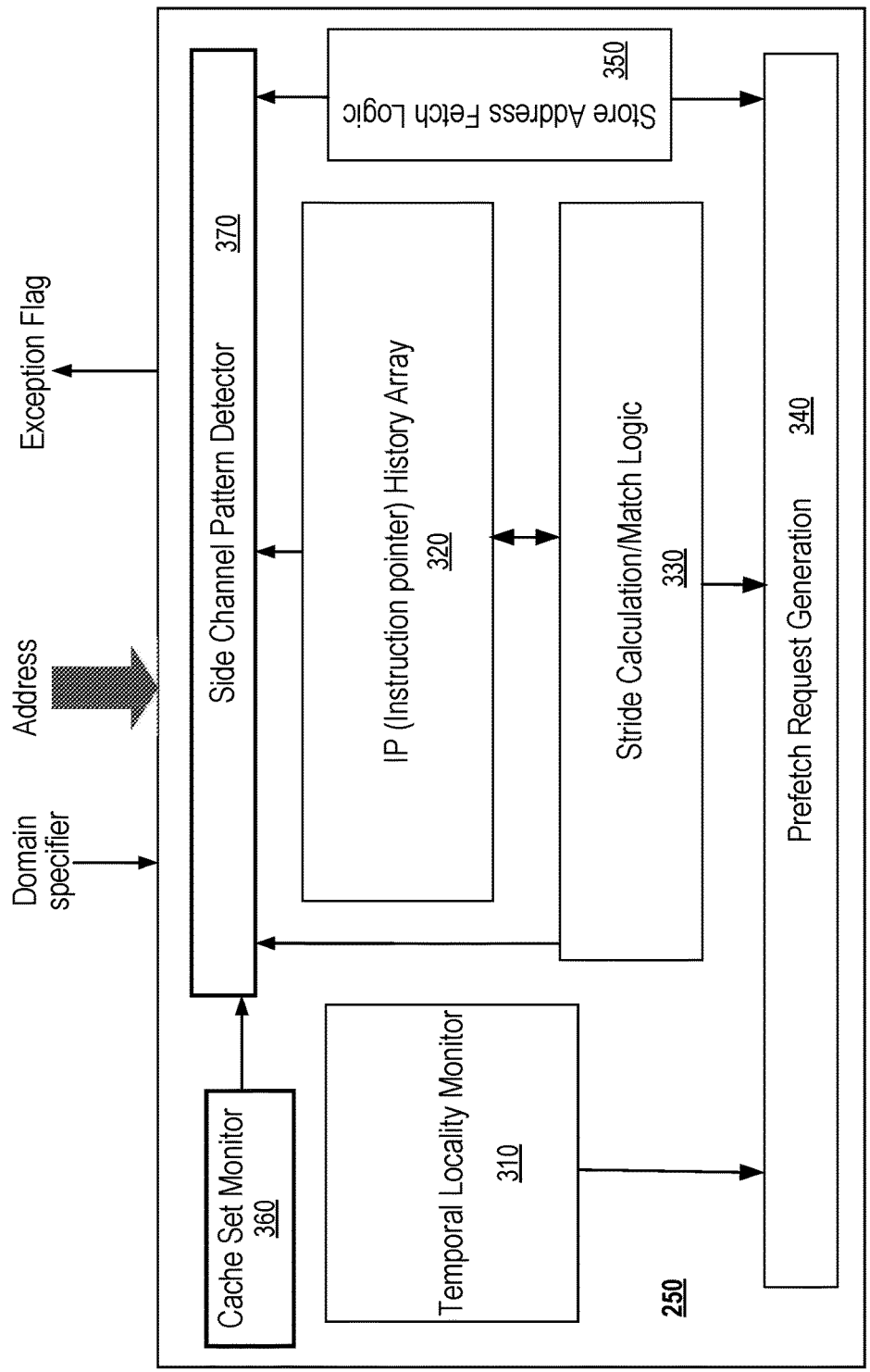
FIG. 4 illustrates one embodiment of a pre-fetcher.

FIG. 4 illustrates one embodiment of pre-fetcher 250 including a temporal locality monitor 310, instruction pointer (IP) history array 320, stride calculation/match logic 330, prefetch request generation 340, store address fetch logic 350, cache set monitor 360 and side channel pattern monitor 370. Temporal locality monitor 310 monitors temporal locality of cache access patterns (e.g., manifested as misses/hits in a time quanta to same cache line) and pre-fetches a next cache lines at adjacent addresses. In a further embodiment, temporal local monitor tracks multiple accesses to the same cache line in certain time quanta and also prefetches cache line addresses adjacent to that cache line.

IP history array 320 monitors accesses to different addresses from the same instruction (e.g., program counter) at which access strides (e.g., a number of locations in cache between beginnings of successive array elements) of an array show a periodicity or regular pattern. This could be indirect jumps to memory accesses with fixed/periodic strides within a loop. Stride calculation/match logic 330 calculates/matches stride accesses based on data received from IP history array 320. In one embodiment, strides may also span cache lines.

Prefetch request generation 340 prefetches a next set of spatially located cache lines into a corresponding cache level based on instruction pointer information and the detection/monitoring of strides. Store address fetch logic 350 stores address information specific (e.g., fetch the store addresses) and issues request for ownership (RFO) commands to other cores/processors to ready cache 240 for optimizing stores (e.g., stores commit to memory only at retirement stage).

According to one embodiment, cache set monitor 360 is implemented to determine a security critical cache address range (or pages) in a virtual address range to monitor in order to determine processes that retrieve data from cache 240. In one embodiment, cache set monitor 360 performs the monitoring by checking protection key permissions via protection key bits. In such an embodiment, the protection key bits may comprise existing protection key bits (e.g., x-86) in page table entries included in page table, or new page table entry bits that enables an operating system memory manager to demarcate security critical pages.

In a further embodiment, cache set monitor 360 facilitates the tagging of physical pages by TLB/PMH 230 with a security bit (e.g., MAX_PA-1 bit) including information to identify a page as being security critical to the upstream CPU pipeline. In such an embodiment, cache set monitor 360 determines a security critical physical address for a specific process-context domain identifier (e.g., CR3 for process) and determines sets in cache that are associated with the security critical physical address. As a result, critical sets of addresses are generated that are to be monitored by cache set monitor 360 for activity (e.g., eviction, loads, flush etc.) by a potential attacker process and a requesting process (e.g., potential victim).

Side channel pattern monitor 370 monitors cache access patterns to detect side-channel cache attacks based on the detection of accesses to the critical sets of addresses at cache set monitor 360. In one embodiment, side channel pattern monitor 370 tracks type of cache accesses as well as access attributes to determine whether a process attempting to access cache 240 is an attacker process. For example, may take note of an instruction pointer for a load and determine whether the instruction pointer matches a previous iteration (e.g., same CR3 register). In another example, side channel pattern monitor 370 may measure a stride from a first element to a second element and determine whether the measured stride matches a stride used at set up during a previous iteration. In one embodiment, side channel pattern monitor 370 may implement a machine learning model to monitor the cache access patterns. However other embodiments may feature heuristic monitoring processes.

In a further embodiment, side channel pattern monitor 370 may generate an interrupt upon detection of a potential onset (or occurrence) of a cache side channel attack to flag the event to system software (e.g., operating system or virtual machine monitor). In a further embodiment, an exception (e.g., an initial load during the attacker measurement phase) may also be generated. In either embodiment, the interrupt/exception includes a reason for exit and domain identifiers (IDs) (e.g. a process identifiers of the attacker and victim process, or extended page table pointers for virtual machines, etc.).

Upon receiving the flag, the system software may perform one or more actions on the platform to mitigate a side-channel cache attack. For example, the system software may separate (or isolate) the attacker and victim processes/domains on two different cores or packages based on an assumed threat model, thereby minimizing sharing of CPU resources. Additionally, the system software may turn on micro-architectural/architectural level defenses (e.g., enabling memory subsystem, system on chip (SoC) fabric tagging (in H/W bits), partitioning shared micro-architectural resources, reducing scope of speculative loads, etc.) on demand based on the flag. This action guarantees higher security against cache side channels. Further, the system software may perform further fine grained monitoring of the potential attacker program patterns and/or place the potential attacker program patterns in operating system defined containers to limit access ranges.

Figure 5:
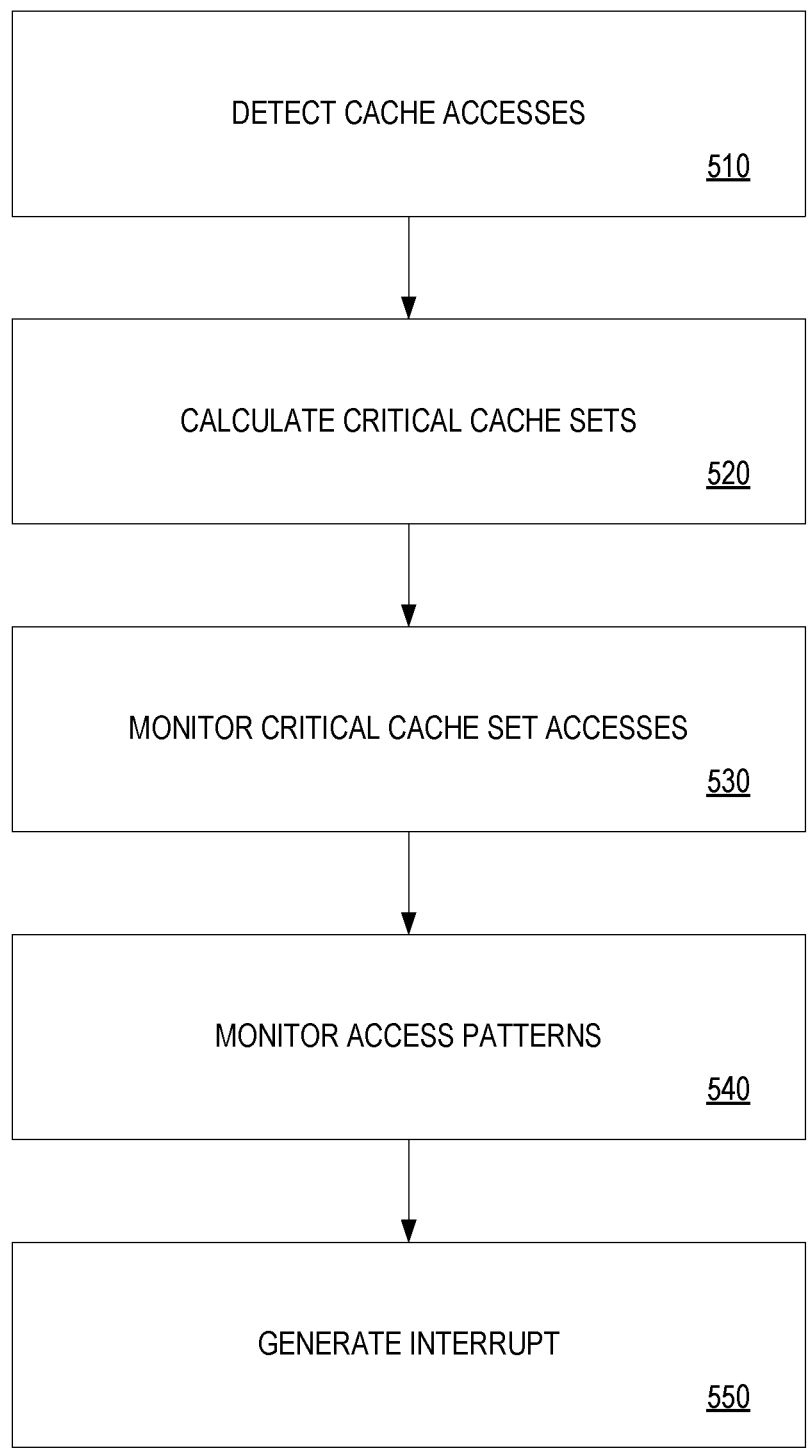
FIG. 5 is a flow diagram illustrating one embodiment of process performed by a pre-fetcher.

FIG. 5 is a flow diagram illustrating one embodiment of a monitoring process performed by a pre-fetcher. At processing block 510, cache accesses are detected. In one embodiment this process is performed during an attacker set up phase, and may include: detecting an IP for cflush/load in a loop (e.g., via IP history array 320); monitoring array access stride (e.g., stride calculation/match logic 330); determining whether stride is greater than page boundary; determining whether stride matches an IP used in a previous iteration for the same CR3.

At processing block 520, the critical cache sets (e.g., cache sets associated with desired pages) are calculated. In one embodiment, set state is also observed to determine whether elements in the cache sets were previously evicted by another domain. In one embodiment, this process occurs during the attacker victim stage. At processing block 530, the critical cache sets are monitored (e.g., load or evictions to/from to the cache sets by a victim program). At processing block 540, access patterns are monitored to detect side-channel cache attacks. At processing block 550, an interrupt (or exception) is generated to flag a possible side-channel cache attack.

Although discussed above with reference to a pre-fetcher, embodiments may also be implemented within a TLB, such as TLB 230. For example, TLBs include pre-fetchers that prefetch page table entries. In such embodiments, the TLB pre-fetchers include monitors and side-channel pattern detectors similar to discussed above.

Figure 6:
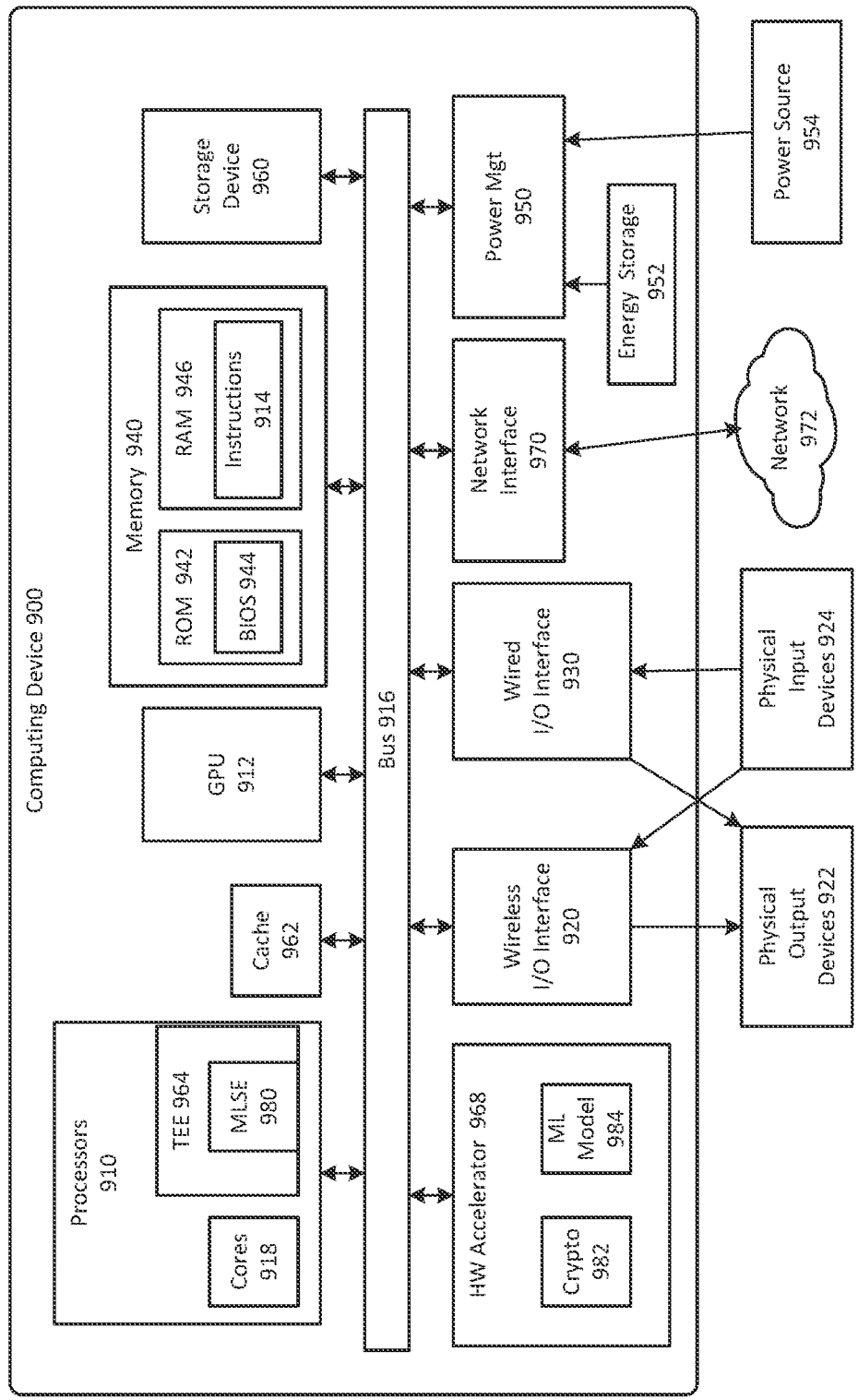
FIG. 6 illustrates one embodiment of a schematic diagram of an illustrative electronic computing device.

FIG. 6 is a schematic diagram of an illustrative electronic computing device to enable enhanced protection against adversarial attacks according to some embodiments. In some embodiments, the computing device 900 includes one or more processors 910 including one or more processors cores 918 and a Trusted Execution Environment (TEE) 964, the TEE including a machine learning service enclave (MLSE) 980. In some embodiments, the computing device 900 includes a hardware accelerator (HW) 968, the hardware accelerator including a cryptographic engine 982 and a machine learning model 984. In some embodiments, the computing device is to provide enhanced protections against ML adversarial attacks, as provided in FIGS. 1-5.

The computing device 900 may additionally include one or more of the following: cache 962, a graphical processing unit (GPU) 912 (which may be the hardware accelerator in some implementations), a wireless input/output (I/O) interface 920, a wired I/O interface 930, memory circuitry 940, power management circuitry 950, non-transitory storage device 960, and a network interface 970 for connection to a network 972. The following discussion provides a brief, general description of the components forming the illustrative computing device 900. Example, non-limiting computing devices 900 may include a desktop computing device, blade server device, workstation, or similar device or system.

In embodiments, the processor cores 918 are capable of executing machine-readable instruction sets 914, reading data and/or instruction sets 914 from one or more storage devices 960 and writing data to the one or more storage devices 960. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 918 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 900 includes a bus or similar communications link 916 that communicably couples and facilitates the exchange of information and/or data between various system components including the processor cores 918, the cache 962, the graphics processor circuitry 912, one or more wireless I/O interfaces 920, one or more wired I/O interfaces 930, one or more storage devices 960, and/or one or more network interfaces 970. The computing device 900 may be referred to in the singular herein, but this is not intended to limit the embodiments to a single computing device 900, since in certain embodiments, there may be more than one computing device 900 that incorporates, includes, or contains any number of communicably coupled, collocated, or remote networked circuits or devices.

The processor cores 918 may include any number, type, or combination of currently available or future developed devices capable of executing machine-readable instruction sets.

The processor cores 918 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 916 that interconnects at least some of the components of the computing device 900 may employ any currently available or future developed serial or parallel bus structures or architectures.

The system memory 940 may include read-only memory ("ROM") 942 and random access memory ("RAM") 946. A portion of the ROM 942 may be used to store or otherwise retain a basic input/output system ("BIOS") 944. The BIOS 944 provides basic functionality to the computing device 900, for example by causing the processor cores 918 to load and/or execute one or more machine-readable instruction sets 914. In embodiments, at least some of the one or more machine-readable instruction sets 914 cause at least a portion of the processor cores 918 to provide, create, produce, transition, and/or function as a dedicated, specific, and particular machine, for example a word processing machine, a digital image acquisition machine, a media playing machine, a gaming system, a communications device, a smartphone, or similar.

The computing device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 924 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The computing device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include, but are not limited to: universal serial bus (USB), IEEE 1394 ("FireWire"), and similar.

The computing device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the computing device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor cores 918 and/or graphics processor circuitry 912 and/or one or more applications executed on or by the processor cores 918 and/or graphics processor circuitry 912. In some instances, one or more data storage devices 960 may be communicably coupled to the processor cores 918, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or Wi-Fi®, etc.).

Processor-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor cores 918 and/or graphics processor circuitry 912.

The computing device 900 may include power management circuitry 950 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the computing device 900. The power source 954 may include, but is not limited to, a solar power system, a commercial electric grid, a portable generator, an external energy storage device, or any combination thereof.

For convenience, the processor cores 918, the graphics processor circuitry 912, the wireless I/O interface 920, the wired I/O interface 930, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 918 and/or the graphics processor circuitry 912. In some embodiments, all or a portion of the bus 916 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to facilitate data cache security, comprising a cache memory to store data and prefetch hardware to pre-fetch data to be stored in the cache memory, including a cache set monitor hardware to determine critical cache addresses to monitor to determine processes that retrieve data from the cache memory and pattern monitor hardware to monitor cache access patterns to the critical cache addresses to detect potential side-channel cache attacks on the cache memory by an attacker process.

Example 2 includes the subject matter of Example 1, wherein the cache set monitor checks protection key permissions via protection key bits.

Example 3 includes the subject matter of Examples 1 and 2, further comprising a translation lookaside buffer comprising a security bit including bit information to identify a page as being security critical.

Example 4 includes the subject matter of Examples 1-3, wherein the cache set monitor determines a critical cache address as an address associated with a security critical page.

Example 5 includes the subject matter of Examples 1-4, wherein the pattern monitor hardware generates an interrupt upon detection of a side-channel cache attack.

Example 6 includes the subject matter of Examples 1-5, wherein the pattern monitor hardware transmits the interrupt to system software.

Example 7 includes the subject matter of Examples 1-6, wherein the system software performs one or more actions to mitigate the side-channel cache attack.

Example 8 includes the subject matter of Examples 1-7, wherein the interrupt comprises a reason for exit and a domain identifiers associated with each process that accessed the critical cache addresses.

Example 9 includes the subject matter of Examples 1-8, wherein the pattern monitor hardware implements a machine learning model to monitor the cache access patterns.

Some embodiments pertain to Example 10 that includes a method to facilitate data cache security, comprising determining critical cache addresses to monitor to determine processes that retrieve data from the cache memory; and monitoring cache access patterns to the critical cache addresses to detect potential side-channel cache attacks on the cache memory by an attacker process.

Example 11 includes the subject matter of Example 10, further comprising checking protection key permissions via protection key bits.

Example 12 includes the subject matter of Examples 10 and 11, further comprising generating an interrupt upon detection of a side-channel cache attack.

Example 13 includes the subject matter of Examples 10-12, further comprising transmitting the interrupt to system software.

Example 14 includes the subject matter of Examples 10-13, wherein the interrupt comprises a reason for exit and a domain identifiers associated with each process that accessed the critical cache addresses.

Example 15 includes the subject matter of Examples 10-14, wherein a machine learning model is implemented to monitor the cache access patterns.

Some embodiments pertain to Example 16 that includes a central processing unit (CPU) comprising a plurality of execution units, a cache memory to store data; and prefetch hardware to pre-fetch data to be stored in the cache memory, including a cache set monitor hardware to determine critical cache addresses to monitor to determine processes that retrieve data from the cache memory and pattern monitor hardware to monitor cache access patterns to the critical cache addresses to detect potential side-channel cache attacks on the cache memory by an attacker process.

Example 17 includes the subject matter of Example 16, wherein the cache set monitor checks protection key permissions via protection key bits.

Example 18 includes the subject matter of Examples 16 and 17, further comprising a translation lookaside buffer comprising a security bit including bit information to identify a page as being security critical.

Example 19 includes the subject matter of Examples 16-18, wherein the cache set monitor determines a critical cache address as an address associated with a security critical page.

Example 20 includes the subject matter of Examples 16-19, wherein the pattern monitor hardware generates an interrupt upon detection of a side-channel cache attack.

Some embodiments pertain to Example 21 that includes at least one computer readable medium having instructions stored thereon, which when executed by one or more processors, cause the processors to determine critical cache addresses to monitor to determine processes that retrieve data from a cache memory and monitor cache access patterns to the critical cache addresses to detect potential side-channel cache attacks on the cache memory by an attacker process.

Example 22 includes the subject matter of Example 21, having instructions stored thereon, which when executed by one or more processors, further cause the processors to generate an interrupt upon detection of a side-channel cache attack and transmit the interrupt to system software.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus comprising:
a cache memory to store data; and
a processor comprising prefetch circuitry to pre-fetch data to be stored in the cache memory, including:
cache set monitor circuitry to determine one or more security critical physical addresses associated with a process and determine critical cache addresses associated with the one or more critical physical address to monitor; and
pattern monitor circuitry to monitor cache access patterns to the critical cache addresses to detect potential side-channel cache attacks on the critical cache addresses by an attacker process.

2. The apparatus of claim 1, wherein the cache set monitor circuitry checks protection key permissions via protection key bits.

3. The apparatus of claim 2, further comprising a translation lookaside buffer to tag the one or more physical pages with a security bit including bit information to identify a page as being security critical.

4. The apparatus of claim 1, wherein the pattern monitor circuitry tracks type of cache accesses and access attributes to determine that a process attempting to access the cache is an attacker process.

5. The apparatus of claim 1, wherein the pattern monitor circuitry generates an interrupt upon detection of a side-channel cache attack.

6. The apparatus of claim 5, further comprising one or more execution units to receive the interrupt and perform one or more actions to mitigate the side-channel cache attack.

7. The apparatus of claim 6, wherein the system software performs one or more actions to mitigate the side-channel cache attack.

8. The apparatus of claim 5, wherein the interrupt comprises a reason for exit and a domain identifier associated with each process that accessed the critical cache addresses.

9. The apparatus of claim 1, wherein the pattern monitor circuitry implements a machine learning model to monitor the cache access patterns.

10. A method comprising:
determining one or more security critical physical addresses associated with a process;
determining critical cache addresses associated with the one or more critical physical address to monitor; and
monitoring cache access patterns to the critical cache addresses to detect potential side-channel cache attacks on the critical cache addresses by an attacker process.

11. The method of claim 10, further comprising checking protection key permissions via protection key bits.

12. The method of claim 11, further comprising generating an interrupt upon detection of a side-channel cache attack.

13. The method of claim 12, further comprising transmitting the interrupt to system software.

14. The method of claim 13, wherein the interrupt comprises a reason for exit and a domain identifiers associated with each process that accessed the critical cache addresses.

15. The method of claim 10, wherein a machine learning model is implemented to monitor the cache access patterns.

16. A central processing unit (CPU) comprising:
a plurality of execution units;
a cache memory to store data; and
a processor comprising prefetch circuitry to pre-fetch data to be stored in the cache memory, including:
cache set monitor circuitry to determine one or more security critical physical addresses associated with a process and determine critical cache addresses associated with the one or more critical physical address to monitor; and
pattern monitor circuitry to monitor cache access patterns to the critical cache addresses to detect potential side-channel cache attacks on the critical cache addresses by an attacker process.

17. The CPU of claim 16, wherein the cache set monitor circuitry checks protection key permissions via protection key bits.

18. The CPU of claim 17, further comprising a translation lookaside buffer comprising a security bit including bit information to identify a page as being security critical.

19. The CPU of claim 16, wherein the pattern monitor circuitry generates an interrupt upon detection of a side-channel cache attack.

20. The CPU of claim 19, further comprising one or more execution units to receive the interrupt and perform one or more actions to mitigate the side-channel cache attack.

21. At least one non-transitory computer readable medium having instructions stored thereon, which when executed by one or more processors, cause the processors to:
determine one or more security critical physical addresses associated with a process;
determine critical cache addresses to monitor associated with the one or more critical physical address to monitor; and
monitor cache access patterns to the critical cache addresses to detect potential side-channel cache attacks on the critical cache addresses by an attacker process.

22. The at least one non-transitory computer readable medium of claim 21, having instructions stored thereon, which when executed by one or more processors, further cause the processors to:
generate an interrupt upon detection of a side-channel cache attack; and
transmit the interrupt to system software.

* * * * *